(No Model.)  2 Sheets—Sheet 1.

S. SHEETS.
REVOLVING HARROW.

No. 454,188.  Patented June 16, 1891.

Witnesses
F. H. Moore
Mayne Reid

Inventor
Samuel Sheets
by Wm. M. Monroe
Attorney (No Model.) 2 Sheets—Sheet 2.

S. SHEETS.
REVOLVING HARROW.

No. 454,188. Patented June 16, 1891.

Witnesses
F. H. Moore
Maquie Reed

Inventor
Samuel Sheets
by Wm M. Monroe
Attorney

UNITED STATES PATENT OFFICE.

SAMUEL SHEETS, OF ASHLAND, OHIO.

REVOLVING HARROW.

SPECIFICATION forming part of Letters Patent No. 454,188, dated June 16, 1891.

Application filed January 31, 1891. Serial No. 379,860. (No model.)

*To all whom it may concern:*

Be it known that I, SAMUEL SHEETS, a citizen of the United States, and a resident of Ashland, county of Ashland, State of Ohio, have invented certain new and useful Improvements in Revolving Harrows, of which I hereby declare the following to be a full, clear, and exact description, such as will enable others skilled in the art to which it appertains to make and use the same.

My invention relates to improvements in revolving harrows; and its objects are to provide an efficient harrow for fine pulverizing, which shall be adjustable for light or deep work, at the will of the operator, and capable of self-cleansing and turning easily within a short radius.

My invention consists in the details of construction and combination and arrangement of parts, as hereinafter described, shown in the accompanying drawings, and more specifically pointed out in the claim.

Figure 1:
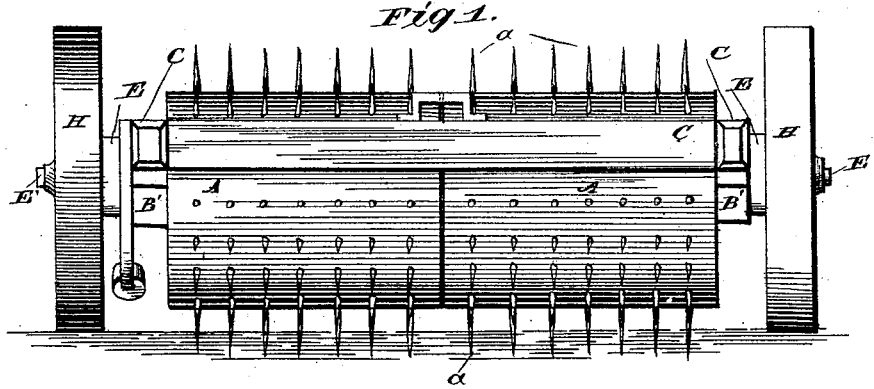
Figure 2:
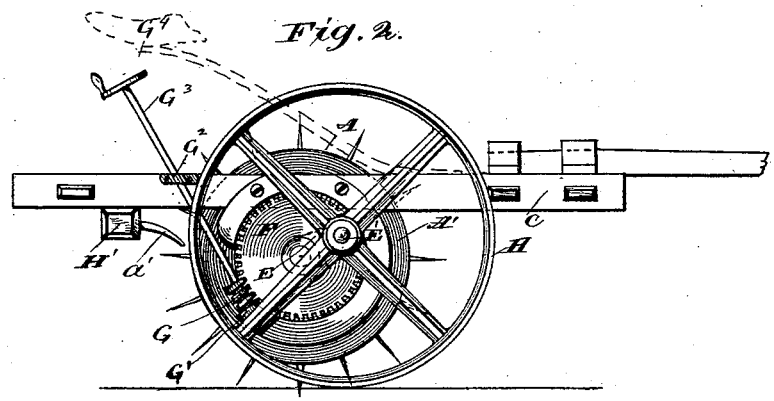
Figures 5, 6:
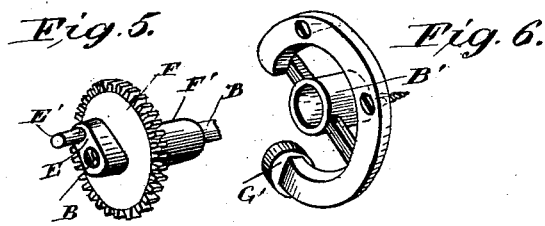
Figure 3:
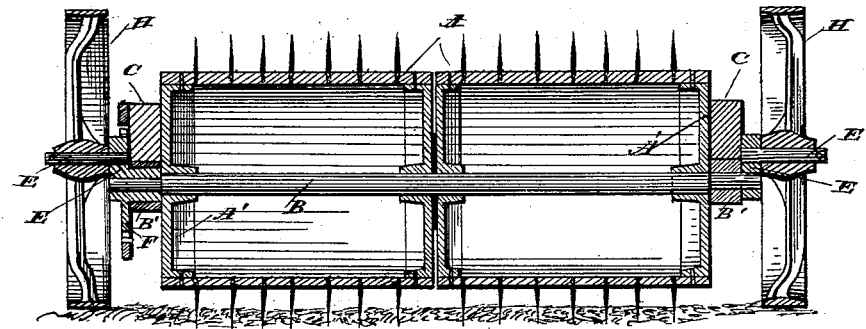
Figure 4:
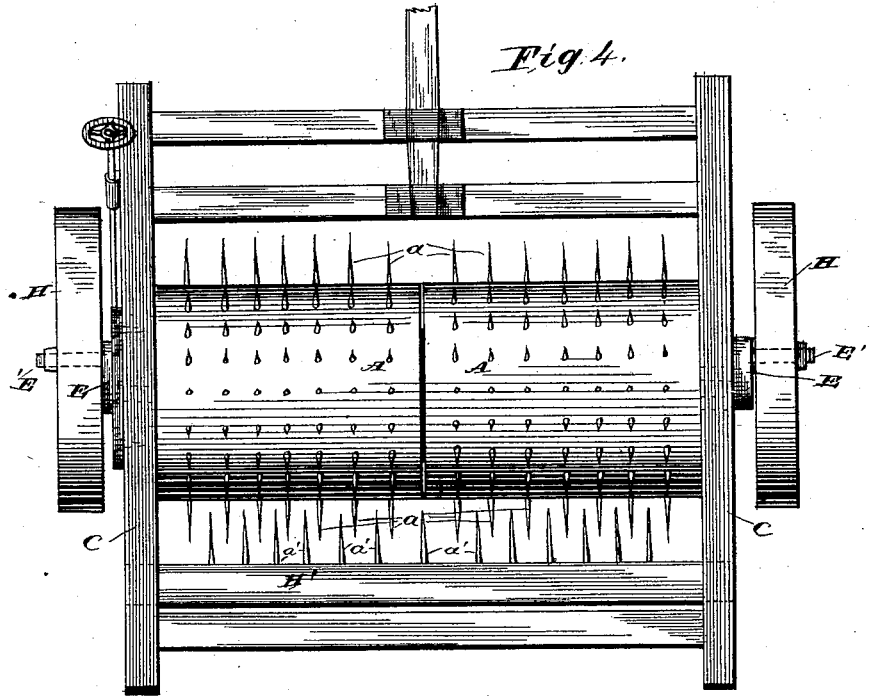

In the accompanying drawings, Figure 1 is a front elevation of the roller-harrow. Fig. 2 is a side elevation of the same. Fig. 3 is a longitudinal central section. Fig. 4 is a plan view, and Fig. 5 is a detached view, of the worm and sleeve, and Fig. 6 of the worm-wheel bearing.

In the drawings, A is the harrow-roller, which is transversely divided into two portions, both of which are provided with heads A′ at either end, which are supported upon the central shaft B, passing entirely through them and secured in bearings B′ upon the rectangular frame C, to which the tongue D is attached. The peripheries of the rollers are covered with sharp teeth or spines $a$ of malleable steel or iron, preferably screwed into the surface, which is shown as formed of wooden segments secured to cast-iron heads. These teeth are made of any length desirable.

Upon the outer extremities of the shaft D are attached the short cranks E, to which are secured wrist-pins E′. Upon these wrists are hung the road-wheels H, of greater diameter than the rollers A, but with pivots so eccentric in relation to the shaft that when the wrists are lowered below the line of the shaft the rollers and teeth will be off from the ground, so as to enable the machine to be driven to or from the field without touching the points of the teeth to the ground in passing. In order to operate these cranks, which are swung at corresponding angles to the central shaft, and to alter the relative position of the road-wheels and rollers at will, a worm-wheel F is secured to the main shaft outside of one of the frame-bearings B′, and a worm G upon suitable bearings on the frame, as at G′ and $G^2$, the worm G being secured to the operating-rod $G^3$, with the terminal wheel $G^4$ within reach of the operator when seated. In operation, by turning this wheel the main shaft will be caused to turn and thus revolve the crank. For security the sleeve F′ may be added to the rear of the worm-wheel and inclosed within the bearing B′. When the surface is to be finely pulverized at a slight depth, the wrists are lowered, thus bringing the teeth nearer the surface; but when it is desired to drag the ground to a greater depth the wheels are raised and the rollers lowered accordingly.

To clean the teeth if the ground is moist, and to prevent them from becoming clogged with lumps, a row of teeth $a'$, corresponding in number and alternating in position with the teeth on the harrow, is placed on the transverse beam H′ in the rear of the rollers and strippers.

I do not claim the exact size, shape, or materials used in the construction of my invention; but What I do claim as new, and desire to secure by Letters Patent, is—

In a revolving harrow, the combination of a divided drum A, centrally mounted upon the shaft B and provided with the teeth $a$, frame C and bearings B′, worm G and shaft $G^3$, bearings $G^2$ and G′ with operating-wheel $G^4$, and cranks E with wrists E′ and road-wheels H, substantially as described.

SAMUEL SHEETS.

Witnesses:
WM. M. MONROE,
F. H. MOORE.